(12) United States Patent
Komuro

(10) Patent No.: US 11,248,112 B2
(45) Date of Patent: Feb. 15, 2022

(54) ETHYLENE-VINYL ALCOHOL COPOLYMER RESIN COMPOSITION, MULTILAYER STRUCTURE, AND PACKAGE

(71) Applicant: Mitsubishi Chemical Corporation, Tokyo (JP)

(72) Inventor: Ryohei Komuro, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/779,954

(22) Filed: Feb. 3, 2020

(65) Prior Publication Data

US 2020/0172712 A1 Jun. 4, 2020

Related U.S. Application Data

(63) Continuation of application No. PCT/JP2018/039793, filed on Oct. 26, 2018.

(30) Foreign Application Priority Data

Oct. 27, 2017 (JP) ............... JP2017-207706
Oct. 27, 2017 (JP) ............... JP2017-207954

(51) Int. Cl.
C08L 23/08 (2006.01)
C08K 5/098 (2006.01)
C08L 29/04 (2006.01)

(52) U.S. Cl.
CPC ............ C08L 23/08 (2013.01); C08K 5/098 (2013.01); C08L 29/04 (2013.01); C08L 2201/14 (2013.01)

(58) Field of Classification Search
CPC ..... C08L 29/04; C08L 23/0861; C08K 5/098; C08K 2201/014
See application file for complete search history.

(56) References Cited

U.S. PATENT DOCUMENTS

| | | |
|---|---|---|
| 5,034,281 A | 7/1991 | Kawasaki et al. |
| 5,082,743 A | 1/1992 | Itamura et al. |
| 2003/0022974 A1 | 1/2003 | Tai et al. |
| 2009/0214854 A1 | 8/2009 | Okawara et al. |
| 2010/0080943 A1* | 4/2010 | Uradnisheck ............ B29B 9/12 428/36.91 |
| 2013/0018133 A1 | 1/2013 | Yamasaki et al. |
| 2013/0065001 A1 | 3/2013 | Kani |
| 2013/0225756 A1 | 8/2013 | Igarashi et al. |
| 2014/0316039 A1* | 10/2014 | Inomata ................. C08K 3/38 524/229 |
| 2016/0221313 A1 | 8/2016 | Kawai et al. |
| 2016/0229987 A1* | 8/2016 | Kawai .................. B32B 27/306 |
| 2018/0170025 A1 | 6/2018 | Inoue et al. |

FOREIGN PATENT DOCUMENTS

| | | |
|---|---|---|
| CN | 1289798 A | 4/2001 |
| CN | 1392889 A | 1/2003 |
| CN | 101253041 A | 8/2008 |
| CN | 102171282 A | 8/2011 |
| CN | 103282424 A | 9/2013 |
| CN | 104185652 A | 12/2014 |
| CN | 105722760 A | 6/2016 |
| CN | 107000412 A | 8/2017 |
| JP | 61-220839 | 10/1986 |
| JP | 62-152847 | 7/1987 |
| JP | 1-279949 | 11/1989 |
| JP | 10-001570 | 1/1998 |
| JP | 3-192140 | 7/2001 |
| JP | 2005-082226 | 3/2005 |
| JP | 20019-242644 A | 10/2009 |
| JP | 2012-31405 | 2/2012 |
| JP | 2015-71711 | 4/2015 |

OTHER PUBLICATIONS

IPRP issued in WIPO Patent Application No. PCT/JP2018/039793, dated May 7, 2020, English translation.
ISR issued in WIPO Patent Application No. PCT/IP2018/039793, dated Jan. 29, 2019, English translation.
Supplemental European Search Report issued for European Patent Application No. 18869662.9, dated Sep. 8, 2020, English translation.
Office Action in CN Patent Application No. 201880050699.9, dated Nov. 29, 2021, English translation.

* cited by examiner

Primary Examiner — Jeffrey C Mullis
(74) Attorney, Agent, or Firm — Greenblum & Bernstein, P.L.C.

(57) ABSTRACT

An ethylene-vinyl alcohol copolymer resin composition contains: (A) an ethylene-vinyl alcohol copolymer; (B) an aliphatic carboxylic acid; (C) an aliphatic carboxylic acid metal salt which is a metal salt of the aliphatic carboxylic acid (B); and (D) an alkali metal compound; wherein the aliphatic carboxylic acid metal salt (C) contains a metal moiety that is at least one element selected from the group consisting of long Periodic Table 4th-period d-block elements; wherein the amounts of the aliphatic carboxylic acid (B), the aliphatic carboxylic acid metal salt (C), and the alkali metal compound (D) on a weight basis satisfy the following expressions (1) and (2):

$$0.01 \leq ((D)/(C)) \leq 30 \quad (1)$$

$$0.0005 \leq \{(D)/[(B)/((B)+(C))]\} \leq 1 \quad (2).$$

The ethylene-vinyl alcohol copolymer resin composition is excellent in impact resistance and adhesive strength even without a resin other than an ethylene-vinyl alcohol copolymer blended therein.

6 Claims, No Drawings

ETHYLENE-VINYL ALCOHOL COPOLYMER RESIN COMPOSITION, MULTILAYER STRUCTURE, AND PACKAGE

RELATED APPLICATION

This application is a continuation of International Application No. PCT/JP2018/039793, filed on Oct. 26, 2018, which claims priority to Japanese Patent Application No. 2017-207706 and 2017-207954, filed on Oct. 27, 2017, the entire contents of each of which being hereby incorporated by reference.

TECHNICAL FIELD

The present disclosure relates to an ethylene-vinyl alcohol copolymer (hereinafter referred to as "EVOH") resin composition, more specifically to an EVOH resin composition excellent in impact resistance as well as adhesive strength.

BACKGROUND ART

EVOH has crystalline portions formed due to firm hydrogen bonds between hydroxyl groups richly present in its molecular chains, and these crystalline portions prevent intrusion of oxygen from the outside. Therefore, EVOH is excellent in gas barrier properties, e.g., oxygen barrier property. EVOH is generally used for an intermediate layer of a laminate structure including a plurality of resin layers, and the laminate structure is widely used for various packages.

As described above, EVOH is excellent in gas barrier properties, but tends to be brittle because of its higher crystallinity due to the hydroxyl groups richly present in its molecular chains. Therefore, the EVOH layer of a package is liable to suffer from cracking and pinholes, which can lead to breakage upon impact or the like.

For improvement of the impact resistance of the EVOH, for example, PTL 1 and PTL 2 disclose laminate packages each including a layer of a resin composition containing an EVOH and an ethylene-vinyl acetate copolymer. Further, PTL 3 and PTL 4 disclose laminates each including a layer of a resin composition containing an EVOH and a partially saponified ethylene-vinyl acetate copolymer.

RELATED ART DOCUMENT

Patent Document

PTL 1: JP-A-SHO61(1986)-220839
PTL 2: JP-A-SHO62(1987)-152847
PTL 3: JP-A-HEI1(1989)-279949
PTL 4: JP-A-HEI3(1991)-192140

SUMMARY

In PTL 1 to PTL 4, however, the EVOH is partly replaced with a resin other than the EVOH. Therefore, the proportions of the EVOH in the resin compositions are reduced, so that the resin compositions tend to be poorer in gas barrier properties attributable to the EVOH.

With the spread of internet shopping and the economic development of developing countries in recent years, article distribution has been rapidly globalized. Therefore, the transportation of foods, chemicals, and other articles tends to require longer transportation periods. Hence, there is a demand for an EVOH-based multilayer structure (package) excellent in gas barrier properties and impact resistance, i.e., having a higher resistance to fall and impact during longer-period transportation and handling.

In view of the foregoing, the present disclosure provides an EVOH resin composition excellent in impact resistance and adhesive strength even without the resin other than the EVOH blended therein.

The inventor conducted intensive studies in view of the foregoing and, as a result, found that, where an aliphatic carboxylic acid and a metal salt of the aliphatic carboxylic acid containing at least one metal moiety selected from the group consisting of long Periodic Table 4th-period d-block elements are blended with the EVOH in combination with an alkali metal compound, an EVOH resin composition excellent in impact resistance as well as adhesive strength is provided.

It is generally known that aliphatic acid metal salts promote the thermal decomposition of the EVOH to reduce the impact resistance of the EVOH resin composition. Therefore, those skilled in the art generally refrain from blending such an aliphatic acid metal salt with the EVOH when making attempts to improve the mechanical property (impact resistance) of the EVOH. However, the inventor found that, where the aliphatic carboxylic acid and the specific metal salt of the aliphatic carboxylic acid are used in combination to be blended with the EVOH and the amount of the alkali metal compound satisfies a predetermined relationship with respect to the amounts of the aliphatic carboxylic acid and the aliphatic carboxylic acid metal salt, the mechanical property (impact resistance) is unexpectedly improved.

According to a first aspect of the present disclosure, there is provided an EVOH resin composition containing: (A) an EVOH; (B) an aliphatic carboxylic acid; (C) an aliphatic carboxylic acid metal salt, which is a metal salt of the aliphatic carboxylic acid (B); and (D) an alkali metal compound; wherein the aliphatic carboxylic acid metal salt (C) contains a metal moiety that is at least one element selected from the group consisting of long Periodic Table 4th-period d-block elements; wherein the amounts of the aliphatic carboxylic acid (B), the aliphatic carboxylic acid metal salt (C), and the alkali metal compound (D) on a weight basis satisfy the following expressions (1) and (2):

$$0.01 \leq (\text{Amount of }(D)\text{ on metal basis/Amount of }(C) \text{ on metal basis}) \leq 30 \tag{1}$$

$$0.0005 \leq \{\text{Amount of }(D)\text{ on metal basis/[Amount of }(B)/(\text{Amount of }(B)+\text{Amount of }(C)\text{ on metal basis})]\} \leq 1 \tag{2}$$

According to a second aspect of the present disclosure, a multilayer structure including a layer formed from the EVOH resin composition according to the first aspect is provided. According to a third aspect of the present disclosure, a package formed from the multilayer structure according to the second aspect is provided.

The EVOH resin composition of the present disclosure contains the EVOH (ethylene-vinyl alcohol copolymer) (A), the aliphatic carboxylic acid (B), the aliphatic carboxylic acid metal salt (C) that is the metal salt of the aliphatic carboxylic acid (B), and the alkali metal compound (D). In the EVOH resin composition, the metal moiety of the aliphatic carboxylic acid metal salt (C) is at least one element selected from the group consisting of the long Periodic Table 4th-period d-block elements, and the amounts of the aliphatic carboxylic acid (B), the aliphatic carboxylic acid metal salt (C), and the alkali metal compound (D) on a weight basis satisfy the following expressions (1) and (2):

$$0.01 \leq (\text{Amount of } (D) \text{ on metal basis/Amount of } (C) \text{ on metal basis}) \leq 30 \quad (1)$$

$$0.0005 \leq \{\text{Amount of } (D) \text{ on metal basis}/[\text{Amount of } (B)/(\text{Amount of } (B) + \text{Amount of } (C) \text{ on metal basis})]\} \leq 1 \quad (2)$$

Therefore, a film formed from the EVOH resin composition is excellent in impact resistance and adhesive strength even without the resin other than the EVOH blended therein.

Where the amount of the aliphatic carboxylic acid (B) is 0.01 to 40 wt. % based on the total amount of the aliphatic carboxylic acid (B) and the aliphatic carboxylic acid metal salt (C), the impact resistance and the adhesive strength are more excellent.

Where the amount of the aliphatic carboxylic acid metal salt (C) is 0.0001 to 0.05 wt. % on a metal basis based on the total amount of the EVOH (A), the aliphatic carboxylic acid (B), the aliphatic carboxylic acid metal salt (C), and the alkali metal compound (D), the impact resistance, the color tone stability, and the adhesive strength are still more excellent.

Where the amount of the alkali metal compound (D) is 0.001 to 0.1 wt. % on a metal basis based on the total amount of the EVOH (A), the aliphatic carboxylic acid (B), the aliphatic carboxylic acid metal salt (C), and the alkali metal compound (D), a film formed from the EVOH resin composition is more excellent in impact resistance and adhesive strength, and is excellent in color tone stability.

The multilayer structure of the present disclosure includes the layer formed from the EVOH resin composition and, therefore, is excellent in impact resistance as well as adhesive strength.

The package of the present disclosure is formed from the multilayer structure. Therefore, the package is also excellent in impact resistance as well as adhesive strength.

DESCRIPTION OF EMBODIMENTS

Preferred embodiments of the present disclosure will hereinafter be described in detail. It should be understood that these preferred embodiments are illustrative of the disclosure.

An EVOH resin composition of the present disclosure contains: (A) an EVOH; (B) an aliphatic carboxylic acid; (C) an aliphatic carboxylic acid metal salt; and (D) an alkali metal compound. The respective components will hereinafter be described in turn.

<EVOH (A)>

The EVOH (A) to be used in the present disclosure is a water-insoluble thermoplastic resin typically prepared by saponifying a copolymer of ethylene and a vinyl ester monomer, and known as an ethylene-vinyl alcohol copolymer or a saponified ethylene-vinyl acetate copolymer. A known polymerization method such as solution polymerization method, suspension polymerization method or emulsion polymerization method may be utilized for the polymerization. In general, a solution polymerization method using methanol as a solvent is utilized. The saponification of the resulting ethylene-vinyl ester copolymer may be achieved by a known method.

The EVOH (A) to be used in the present disclosure mainly contains an ethylene structural unit and a vinyl alcohol structural unit, and further contains a small amount of a vinyl ester structural unit left unsaponified. The EVOH is generally referred to as saponified ethylene-vinyl ester copolymer.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters preferably have a carbon number of 3 to 20, more preferably 4 to 10, particularly preferably 4 to 7. These vinyl esters may be typically each used alone or, as required, a plurality of vinyl esters may be selected from these vinyl esters to be used in combination.

The ethylene structural unit content of the EVOH (A), which is measured in conformity with ISO14663, is typically 20 to 60 mol %, preferably 25 to 50 mol %, particularly preferably 25 to 35 mol %. If the ethylene structural unit content is excessively low, the high-humidity gas barrier property and the melt formability tend to be deteriorated. If the ethylene structural unit content is excessively high, on the other hand, the gas barrier property tends to be deteriorated.

The vinyl ester saponification degree of the EVOH (A), which is measured in conformity with JIS K6726 (with the use of a solution obtained by homogenously dissolving the EVOH in a water/methanol solvent), is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated.

The EVOH (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH (A) is excessively high, the film formability tends to be deteriorated. If the MFR of the EVOH (A) is excessively low, the melt extrusion tends to be difficult.

The EVOH (A) to be used in the present disclosure may contain a structural unit derived from any of the following comonomers in addition to the ethylene structural unit and the vinyl alcohol structural unit (including the unsaponified vinyl ester structural unit). For example, the comonomers include: α-olefins such as propylene, isobutene, α-octene, α-dodecene, and α-octadecene; hydroxyl-containing α-olefins such as 3-buten-1-ol, 4-penten-1-ol, and 3-butene-1,2-diol, and derivatives including esterification products and acylation products of these hydroxyl-containing α-olefins; hydroxymethyl vinylidene diacetates such as 1,3-diacetoxy-2-methylenepropane, 1,3-dipropionyloxy-2-methylenepropane, and 1,3-dibutyronyloxy-2-methylenepropane; unsaturated carboxylic acids, and salts, partial alkyl esters, full alkyl esters, nitriles, amides, and anhydrides of the unsaturated carboxylic acids; unsaturated sulfonic acids, and salts of the unsaturated sulfonic acids; vinylsilane compounds; vinyl chloride; and styrene.

Post-modified EVOHs such as urethanized EVOH, acetalized EVOH, cyanoethylated EVOH, and oxyalkylenated EVOH may be used as the EVOH (A).

Of these modified EVOHs, an EVOH having a primary hydroxyl group introduced to its side chain by copolymerization is preferred because the secondary formability in stretching process, vacuum pressure forming process, and the like is improved. Particularly, an EVOH having a 1,2-diol structure in its side chain is preferred.

The EVOH (A) to be used in the present disclosure may be a mixture of different EVOHs. These EVOHs may have different ethylene structural unit contents, different saponification degrees, different melt flow rates (MFRs) (as measured at 210° C. with a load of 2160 g), and different modification degrees (e.g., different contents of the structural unit containing the primary hydroxyl group in the side chain), and contain different comonomer components.

<Aliphatic Carboxylic Acid (B)>

The EVOH resin composition of the present disclosure contains the aliphatic carboxylic acid (B). The aliphatic carboxylic acid (B) typically has a carbon number of 3 to 30, preferably 4 to 20, particularly preferably 5 to 14. Where the carbon number of the aliphatic carboxylic acid (B) falls within the aforementioned range, the effects of the present disclosure tend to be more efficiently provided.

Specific examples of the aliphatic carboxylic acid (B) include: aliphatic monocarboxylic acids including saturated aliphatic monocarboxylic acids such as butyric acid, valeric acid, caproic acid, enanthic acid, caprylic acid, pelargonic acid, capric acid, lauric acid, myristic acid, pentadecylic acid, palmitic acid, margaric acid, stearic acid, arachidic acid, heneicosylic acid, behenic acid, lignoceric acid, montanic acid, melissic acid, tartronic acid, glyceric acid, hydroxybutyric acid, malic acid, tartaric acid, gluconic acid, mevalonic acid, and pantoic acid, and unsaturated aliphatic monocarboxylic acids such as linoleic acid, linolenic acid, pinolenic acid, eleostearic acid, isostearic acid, isononanoic acid, 2-ethylhexanoic acid, 2-heptylundecanoic acid, 2-octyldodecanoic acid, palmitoleic acid, sapienic acid, oleic acid, elaidic acid, vaccenic acid, gadoleic acid, eicosenoic acid, erucic acid, nervonic acid, and ricinoleic acid; aliphatic dicarboxylic acids including saturated aliphatic dicarboxylic acids such as succinic acid, adipic acid, pimelic acid, suberic acid, azelaic acid, and sebacic acid, and unsaturated aliphatic dicarboxylic acids such as eicosadienoic acid and docosadienoic acid; and aliphatic tricarboxylic acids including saturated aliphatic tricarboxylic acids such as citric acid, isocitric acid, and aconitic acid. These aliphatic carboxylic acids may be used alone or in combination as the aliphatic carboxylic acid (B). Particularly, the aliphatic monocarboxylic acids having one carboxyl group are preferred from the viewpoint of the heat stability (for prevention of viscosity increase during melt forming and the occurrence of fisheyes). The saturated aliphatic monocarboxylic acids are more preferred, and stearic acid, caproic acid, caprylic acid, lauric acid, and behenic acid are particularly preferred.

The amount of the aliphatic carboxylic acid (B) contained in the EVOH resin composition is typically 0.01 to 40 wt. %, preferably 0.05 to 30 wt. %, particularly preferably 0.1 to 15 wt. %, especially preferably 0.3 to 5 wt. %, based on the total amount of the aliphatic carboxylic acid (B) and the aliphatic carboxylic acid metal salt (C) to be described later. If the amount of the aliphatic carboxylic acid (B) is excessively small, the effects of the present disclosure tend to be insufficient. If the amount of the aliphatic carboxylic acid (B) is excessively great, the color tone stability tends to be deteriorated during the melt forming, and the effects of the present disclosure tend to be insufficient.

The amount of the aliphatic carboxylic acid (B) based on the total amount of the aliphatic carboxylic acid (B) and the aliphatic carboxylic acid metal salt (C) to be described layer may be measured by a known analysis method without particular limitation to the method. For example, a neutralization titillation method described in JIS K0070 (Test Methods for Acid Value, Saponification Value, Esterification Value, Iodine Value, Hydroxyl Value, and Unsaponifiable Matter of Chemical Products).

<Aliphatic Carboxylic Acid Metal Salt (C)>

The EVOH resin composition of the present disclosure further contains the aliphatic carboxylic acid metal salt (C), which is a metal salt of the aliphatic carboxylic acid (B).

It is essential that the metal moiety of the aliphatic carboxylic acid metal salt (C) is at least one element selected from the group consisting of long Periodic Table 4th-period d-block elements. Particularly, chromium, cobalt, nickel, copper, and zinc are preferred, and zinc is particularly preferred because it is highly effective, less expensive, and easily available.

The reason why excellent effects are provided by the use of the aliphatic carboxylic acid metal salt (C) is not completely known, but it is supposed that, where the metal moiety of the aliphatic carboxylic acid metal salt (C) is at least one element selected from the group consisting of the long Periodic Table 4th-period d-block elements, excessive thermal decomposition that may otherwise deteriorate the mechanical property (impact resistance) is moderately suppressed, and high-dimensional structures (e.g., molecular orientation and crystalline structure) to be formed during multilayer coextrusion of the EVOH resin composition can be made highly uniform and, as a result, the mechanical property (impact resistance) is improved.

The anionic moiety of the aliphatic carboxylic acid metal salt (C) may be any of the exemplary aliphatic carboxylic acids described for the aliphatic carboxylic acid (B). In the present disclosure, it is important that the anionic moiety of the aliphatic carboxylic acid metal salt (C) is the same as the aliphatic carboxylic acid (B). Where the anionic moiety of the aliphatic carboxylic acid metal salt (C) is the same as the aliphatic carboxylic acid (B), the EVOH resin composition can have excellent impact resistance and more excellent color tone stability during the melt forming.

Where the EVOH resin composition of the present disclosure contains a plurality of aliphatic carboxylic acids (B) and a plurality of aliphatic carboxylic acid metal salts (C), it is merely necessary that at least one of the anionic moieties of the plural aliphatic carboxylic acid metal salts (C) is the same as any of the plural aliphatic carboxylic acids (B).

The reason why excellent effects are provided when the anionic moiety of the aliphatic carboxylic acid metal salt (C) is the same as the aliphatic carboxylic acid (B) is not completely known, but it is supposed that, where specific amounts of the aliphatic carboxylic acid (B) and the aliphatic carboxylic acid metal salt (C) are used in combination, the dispersibility of the aliphatic carboxylic acid metal salt (C) is significantly improved to thereby improve the effects of the present disclosure. It is also supposed that the aliphatic carboxylic acid (B) interacts with the metal moiety of the aliphatic carboxylic acid metal salt (C) to thereby exist in the form of a metal complex and, where the anionic moiety of the aliphatic carboxylic acid metal salt (C) is the same as the aliphatic carboxylic acid (B), a stable energy state can be established. Thus, the EVOH resin composition has excellent heat stability during the melt forming and, as a result, is improved in mechanical property (impact resistance).

The amount of the aliphatic carboxylic acid metal salt (C) is typically 0.0001 to 0.05 wt. %, preferably 0.0003 to 0.03 wt. %, particularly preferably 0.0004 to 0.02 wt. %, especially preferably 0.0005 to 0.015 wt. %, on a metal basis based on the total amount of the EVOH (A), the aliphatic carboxylic acid (B), the aliphatic carboxylic acid metal salt (C), and the alkali metal compound (D). If the amount of the aliphatic carboxylic acid metal salt (C) is excessively small, the effects of the present disclosure tend to be insufficient. If the amount of the aliphatic carboxylic acid metal salt (C) is excessively great, the heat stability is liable to be deteriorated.

The amount of the aliphatic carboxylic acid metal salt (C) on a metal basis may be measured by a known analysis method without particular limitation to the method. For example, the following method may be used for the measurement.

A dry sample is precisely weighed, put in a platinum evaporating dish having a known weight, and carbonized by an electric heater. Then, the sample is burned with heating by a gas burner until no smoke is observed. The platinum evaporating dish containing the resulting sample is put in an electric oven, and the sample is fully ashed at an elevated temperature. The resulting ash is cooled, and then hydrochloric acid and purified water are poured over the ash, which is in turn dissolved in the acid solution with heating by the electric heater. The resulting solution is poured in a measuring flask, and diluted with purified water to a predetermined volume, whereby a sample solution for atomic absorption spectrometry is prepared. The amount of the metal contained in the sample solution is measured by the atomic absorption spectrometry, whereby the amount of the aliphatic carboxylic acid metal salt (C) on a metal basis is determined.

<Alkali Metal Compound (D)>

The EVOH resin composition of the present disclosure further contains the alkali metal compound (D). Exemplary alkali metals for the alkali metal compound (D) include lithium, sodium, potassium, rubidium, and cesium, which may be used alone or in combination. Of these, sodium and potassium are preferred, and sodium is particularly preferred. Where two or more alkali metals are used in combination for the alkali metal compound (D), the amount of the alkali metal compound (D) on a metal basis is the total amount of the alkali metals.

The alkali metal compound (D) is typically a low-molecular-weight compound (more specifically, a salt, a hydroxide or the like of any of the alkali metals), and is preferably the salt from the viewpoint of dispersibility.

Examples of the alkali metal salt include: inorganic salts such as carbonates, hydrogen carbonates, phosphates, sulfates, and chlorides of the alkali metals; and organic acid salts including C2 to C11 monocarboxylates such as acetates, butyrates, propionates, enanthates, and caprates of the alkali metals, C2 to C11 dicarboxylates such as oxalates, malonates, succinates, adipates, suberates, and sebacates of the alkali metals, and monocarboxylates such as laurates, palmitates, stearates, 12-hydroxystearates, behenates, and montanates of the alkali metals, having a carbon number of 12 or more. These may be used alone or in combination. Particularly, the organic acid salts of the alkali metals are preferred, and the C2 to C11 monocarboxylates of the alkali metals are particularly preferred. Further, the acetates of the alkali metals are more preferred.

Where the aliphatic carboxylic acid metal salt (C) is blended alone with the EVOH (A), the impact resistance is improved, but the adhesive strength tends to be reduced. The reason for this is not completely known, but it is considered that the aliphatic carboxylic acid metal salt (C) alone is insufficient in heat stability, and the adhesive strength is reduced by decomposition products of the aliphatic carboxylic acid metal salt (C) occurring during the melt forming. In the present disclosure, in contrast, it is supposed that, where the aliphatic carboxylic acid metal salt (C) and the alkali metal compound (D) are used in combination, the alkali metal compound (D) captures a component derived from the aliphatic carboxylic acid (B) out of the decomposition products of the aliphatic carboxylic acid metal salt (C), whereby the reduction in adhesive strength is suppressed.

The amount of the alkali metal compound (D) is typically 0.001 to 0.1 wt. %, preferably 0.002 to 0.05 wt. %, particularly preferably 0.003 to 0.04 wt. %, especially preferably 0.005 to 0.03 wt. %, on a metal basis based on the total amount of the EVOH (A), the aliphatic carboxylic acid (B), the aliphatic carboxylic acid metal salt (C), and the alkali metal compound (D).

If the amount of the alkali metal compound (D) is excessively small, the effects of the present disclosure tend to be insufficient. If the amount of the alkali metal compound (D) is excessively great, the color tone stability tends to be deteriorated during the melt forming, and the effects of the present disclosure tend to be insufficient.

The amount of the alkali metal compound (D) on a metal basis may be measured by a known analysis method without particular limitation to the method. For example, the following method may be used for the measurement.

A dry sample is precisely weighed, put in a platinum evaporating dish having a known weight, and carbonized by an electric heater. Then, the sample is burned with heating by a gas burner until no smoke is observed. The platinum evaporating dish containing the resulting sample is put in an electric oven, and the sample is fully ashed at an elevated temperature. The resulting ash is cooled, and then hydrochloric acid and purified water are poured over the ash, which is in turn dissolved in the acid solution with heating by the electric heater. The resulting solution is poured in a measuring flask, and diluted with purified water to a predetermined volume, whereby a sample solution for atomic absorption spectrometry is prepared. The amount of the metal contained in the sample solution is measured by the atomic absorption spectrometry, whereby the amount of the alkali metal compound (D) on a metal basis is determined.

In the EVOH resin composition of the present disclosure, the weight ratio $((D)/(C))$ of the amount of the alkali metal compound (D) on a metal basis to the amount of the aliphatic carboxylic acid metal salt (C) on a metal basis satisfies the following expression (1):

$$0.01 \leq ((D)/(C)) \leq 30 \tag{1}$$

The expression (1) is preferably $0.05 \leq ((D)/(C)) \leq 15$, particularly preferably $0.1 \leq ((D)/(C)) \leq 8$. Where the weight ratio falls within the aforementioned range, the effects of the present disclosure tend to be more significantly provided.

In the EVOH resin composition of the present disclosure, the amounts of the aliphatic carboxylic acid (B), the aliphatic carboxylic acid metal salt (C), and the alkali metal compound (D) on a weight basis satisfy the following expression (2). In the present disclosure, the amounts of the components (C) and (D) are on a metal basis.

$$0.0005 \leq \{(D)/[(B)/((B)+(C))]\} \leq 1 \tag{2}$$

The expression (2) is preferably $0.001 \leq \{(D)/[(B)/((B)+(C))]\} \leq 0.8$, particularly preferably $0.003 \leq \{(D)/[(B)/((B)+(C))]\} \leq 0.5$, especially preferably $0.005 \leq \{(D)/[(B)/((B)+(C))]\} \leq 0.25$. Where this value falls within the aforementioned range, the effects of the present disclosure tend to be more significantly provided.

The reason why excellent effects are provided when the amounts of the aliphatic carboxylic acid (B), the aliphatic carboxylic acid metal salt (C), and the alkali metal compound (D) on a weight basis satisfy the above expression (2) is not completely known, but it is supposed that the specific amount of the aliphatic carboxylic acid (B), which is the same as the anionic moiety of the aliphatic carboxylic acid metal salt (C), has an effect for improving the dispersibility of the aliphatic carboxylic acid metal salt (C) and the heat stability. On the other hand, it is also supposed that, if the amount of the aliphatic carboxylic acid (B) is excessively great, the color tone stability is liable to be deteriorated during the melt forming, and the aliphatic carboxylic acid (B) itself serves as a plasticizer to thereby fail to sufficiently provide the effects of the present disclosure (impact resistance improving effect). Further, it is supposed that the specific amount of the alkali metal compound (D) has an effect for capturing the thermal decomposition products of the aliphatic carboxylic acid metal salt (C) to suppress the reduction in adhesive strength. On the other hand, it is also supposed that, if the amount of the alkali metal compound (D) is excessively great, the heat stability of the EVOH (A) is significantly deteriorated, and the color tone stability is liable to be deteriorated, thereby making it impossible to sufficiently provide the effects of the present disclosure (impact resistance improving effect).

<Other Thermoplastic Resin>

The EVOH resin composition of the present disclosure may contain a thermoplastic resin other than the EVOH (A) as a resin component typically in an amount of not greater than 30 wt. % based on the weight of the EVOH (A).

Examples of the other thermoplastic resin include: olefin homopolymers and copolymers such as linear low-density polyethylenes, low-density polyethylenes, medium-density polyethylenes, high-density polyethylenes, ionomers, ethylene-propylene copolymers, polypropylenes, polybutenes, and polypentenes; polycycloolefins; polyolefin resins in a broader sense including unsaturated carboxyl-modified polyolefin resins obtained by graft-modifying any of the aforementioned olefin homopolymers and copolymers with an unsaturated carboxylic acid or an unsaturated carboxylic acid ester; polystyrene resins, polyesters, polyamide resins, copolymerized polyamide resins, polyvinyl chlorides, polyvinylidene chlorides, acrylic resins, vinyl ester resins, chlorinated polyethylenes, and chlorinated polypropylenes, which may be used alone or in combination.

Particularly, where a multilayer structure is to be produced for use as a food package by using the EVOH resin composition of the present disclosure, it is preferred to blend a polyamide resin in the EVOH resin composition in order to prevent an EVOH layer from leaching from an edge of the package after hot water treatment of the package. The polyamide resin is capable of forming a network structure with its amide bonds interacting with OH groups and/or ester groups of the EVOH, thereby preventing the leaching of the EVOH during the hot water treatment. Therefore, where the EVOH resin composition of the present disclosure is used for a package for retort food or boilable food, it is preferred to blend the polyamide resin in the EVOH resin composition.

Known polyamide resins are usable as the polyamide resin.

Specific examples of the polyamide resins include: polyamide homopolymers such as polycapramide (nylon 6), poly-ω-aminoheptanoic acid (nylon 7), poly-ω-aminononanoic acid (nylon 9), polyundecanamide (nylon 11), and polylauryllactam (nylon 12); polyamide copolymer resins including aliphatic polyamides such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymers (nylon 6/12), caprolactam/w-aminononanoic acid copolymers (nylon 6/9), caprolactam/hexamethylenediammonium adipate copolymers (nylon 6/66), lauryllactam/hexamethylenediammonium adipate copolymers (nylon 12/66), ethylenediamine adipamide/hexamethylenediammonium adipate copolymers (nylon 26/66), caprolactam/hexamethylenediammonium adipate/hexamethylenediammonium sebacate copolymers (nylon 66/610), and ethyleneammonium adipate/hexamethylenediammonium adipate/hexamethylenediammonium sebacate copolymers (nylon 6/66/610), and aromatic polyamides such as polyhexamethylene isophthalamide, polyhexamethylene terephthalamide, poly-m-xylene adipamide, hexamethylene isophthalamide/terephthalamide copolymers, poly-p-phenylene terephthalamide, and poly-p-phenylene/3,4'-diphenyl ether terephthalamide; amorphous polyamides, polyamide resins obtained by modifying any of these polyamide resins with an aromatic amine such as methylenebenzylamine or m-xylenediamine, and m-xylylenediammonium adipate. These polyamide resins may be terminal-modified. A polyamide resin obtained by terminal-modifying any of these polyamide resins is preferred. These polyamide resins may be used alone or in combination.

<Other Additives>

The EVOH resin composition of the present disclosure may contain additives that are generally blended with the EVOH in amounts that do not impair the effects of the present disclosure (e.g., typically not greater than 10 wt. %, preferably not greater than 5 wt. %, based on the weight of the EVOH resin composition). Examples of the additives include heat stabilizer, antioxidant, antistatic agent, colorant, UV absorber, lubricant, plasticizer, light stabilizer, surfactant, antibacterial agent, drying agent, anti-blocking agent, flame retardant, crosslinking agent, foaming agent, nucleating agent, anti-fogging agent, biodegradation agent, silane coupling agent, oxygen absorber, and inorganic filler, which may be used alone or in combination.

Examples of the heat stabilizer to be used for improving the heat stability and other physical properties during the melt forming include organic acids such as acetic acid, propionic acid, butyric acid, lauric acid, stearic acid, oleic acid, and behenic acid (if any of these organic acids is used as the aliphatic carboxylic acid (B), the organic acid is excluded from the heat stabilizer), and alkali earth metal salts (calcium salts, magnesium salts, and the like). These may be used alone or in combination.

<EVOH Resin Composition Production Method>

A method of producing the EVOH resin composition of the present disclosure is not particularly limited, but the following exemplary methods (I) to (IV) may be employed:

(I) a dry-blending method including the step of dry-blending at least one selected from the group consisting of the aliphatic carboxylic acid (B), the aliphatic carboxylic acid metal salt (C), and the alkali metal compound (D) in a predetermined proportion with pellets of the EVOH (A);

(II) an immersion method including the steps of immersing pellets of the EVOH (A) in a solution containing at least one selected from the group consisting of the aliphatic carboxylic acid (B), the aliphatic carboxylic acid metal salt (C), and the alkali metal compound (D), and drying the resulting pellets;

(III) a melt-kneading method including the steps of melt-kneading the EVOH (A), blending at least one selected from the group consisting of the aliphatic carboxylic acid (B), the aliphatic carboxylic acid metal salt (C), and the alkali metal compound (D) with the EVOH (A) during the melt-kneading, and forming the resulting melt mixture into pellets; and (IV) a solution mixing method including the steps of adding at least one selected from the group consisting of the aliphatic carboxylic acid (B), the aliphatic carboxylic acid metal salt (C), and the alkali metal compound (D) to a solution containing the EVOH (A), mixing the resulting solution, and removing a solvent from the mixture solution.

Of these methods, the dry-blending method (I) is preferred, and a method (dry-blending method) in which the aliphatic carboxylic acid (B), the aliphatic carboxylic acid metal salt (C), and the alkali metal compound (D) are dry-blended in predetermined proportions with the pellets of the EVOH (A) is industrially preferred because this method is practical in terms of productivity and economy. Plural methods may be selected from the aforementioned methods, and used in combination. The EVOH resin composition containing any of the aforementioned additives may be produced by blending the additives by the methods (I) to (IV).

A known mixing apparatus such as rocking mixer, ribbon blender, or line mixer may be used for the dry blending in the method (I).

For the dry blending in the method (I), the water content of the pellets of the EVOH (A) is preferably adjusted to 0.1 to 5 wt. %, more preferably 0.5 to 4 wt. %, particularly preferably 1 to 3 wt. %, in order to improve the adhesion of the at least one of the aliphatic carboxylic acid (B), the aliphatic carboxylic acid metal salt (C), and the alkali metal compound (D) to the pellets of the EVOH (A). If the water content is excessively low, the at least one of the aliphatic carboxylic acid (B), the aliphatic carboxylic acid metal salt (C), and the alkali metal compound (D) is liable to be detached from the pellets of the EVOH (A) to be thereby unevenly distributed over the pellets of the EVOH (A). If the water content is excessively high, the at least one of the aliphatic carboxylic acid (B), the aliphatic carboxylic acid metal salt (C), and the alkali metal compound (D) is liable to agglomerate to be thereby unevenly distributed over the pellets of the EVOH (A).

The water content of the pellets of the EVOH (A) is herein measured and calculated in the following manner.

[Water Content Measuring Method]

The weight (W1 in a unit of g) of the pellets of the EVOH (A) is measured by an electronic balance, and the EVOH pellets are dried in a hot air oven dryer kept at 150° C. for 5 hours and cooled for 30 minutes in a desiccator. Then, the weight (W2 in a unit of g) of the resulting EVOH pellets is measured. The water content of the EVOH pellets is calculated from the following expression:

$$\text{Water content (\%)}=[(W1-W2)/W1]\times 100$$

In the methods (I) and (II), the pellets of the EVOH (A) with the aliphatic carboxylic acid (B), the aliphatic carboxylic acid metal salt (C), and the alkali metal compound (D) adhering to outer surfaces thereof are produced.

A known melt-kneading apparatus such as kneader, extruder, mixing roll, Banbury mixer, or Plast mill may be used for the melt kneading in the method (III). The melt kneading is typically performed at 150° C. to 300° C., preferably 180° C. to 280° C., for about 1 to about 20 minutes. Particularly, it is industrially advantageous to use a single screw extruder or a twin screw extruder, because the pellets can be easily produced. As required, the extruder is preferably provided with a vent suction apparatus, a gear pump apparatus, a screen apparatus, and/or the like. Particularly, the extruder may be provided with one or more vent holes to reduce the pressure by suction for removal of water and side products (thermally decomposed low-molecular weight substances, and the like), or an inert gas such as nitrogen may be continuously fed into a hopper for prevention of intrusion of oxygen into the extruder. Thus, the EVOH resin composition has a higher quality with the heat coloration and the thermal degradation suppressed.

The method for feeding the ingredients into the melt-kneading apparatus such as the extruder is not particularly limited. Exemplary methods for the feeding include:

(1) a method including the steps of dry-blending the EVOH (A), the aliphatic carboxylic acid (B), the aliphatic carboxylic acid metal salt (C), and the alkali metal compound (D), and feeding the resulting blend into the extruder;

(2) a solid side feeding method including the steps of feeding and melting the EVOH (A) in the extruder, and feeding the aliphatic carboxylic acid (B), the aliphatic carboxylic acid metal salt (C), and the alkali metal compound (D) in a solid state into the melted EVOH (A); and (3) a melt side feeding method including the steps of feeding and melting the EVOH (A) in the extruder, and feeding the aliphatic carboxylic acid (B), the aliphatic carboxylic acid metal salt (C), and the alkali metal compound (D) in a melted state into the melted EVOH (A). Particularly, the method (1) is practical because of the simplicity of the apparatus and the costs of the blend.

A known method may be used for the formation of the pellets after the melt kneading. Examples of the method include strand cutting method, and hot cutting method (in-air cutting method and underwater cutting method). The strand cutting method is preferred from the viewpoint of the industrial productivity.

A known good solvent for the EVOH may be used as the solvent in the solution mixing method. Typical examples of the solvent include mixed solvents containing water and C1 to C4 aliphatic alcohols. Mixed solvents containing water and methanol are preferred. The EVOH (A) may be dissolved at any desired concentration in the solvent with heating and/or pressurization as required. The aliphatic carboxylic acid (B), the aliphatic carboxylic acid metal salt (C), and the alkali metal compound (D) may be blended with a solution or a paste of the EVOH (A). In this case, the aliphatic carboxylic acid (B), the aliphatic carboxylic acid metal salt (C), and the alkali metal compound (D) to be blended may be in solid state, solution state, or dispersion state.

After the blending, the EVOH resin composition solution or paste containing the aliphatic carboxylic acid (B), the aliphatic carboxylic acid metal salt (C), and the alkali metal compound (D) homogeneously dispersed therein is formed into pellets by any of the aforementioned known methods. In terms of the industrial productivity, the underwater cutting method is preferred. The pellets thus formed are dried by a known method.

The pellets may each have any desired shape, for example, spherical shape, oval shape, cylindrical shape, cubic shape, square prism shape, or the like, and typically the oval shape or the cylindrical shape. The oval pellets typically each have a minor diameter of 1 to 10 mm and a major diameter of 1.5 to 30 mm, preferably a minor diameter of 2 to 6 mm and a major diameter of 3 to 20 mm, particularly preferably a minor diameter of 2.5 to 5.5 mm and a major diameter of 3.5 to 10 mm, for easy handling thereof in the subsequent use as a forming material. The cylindrical pellets typically each have a bottom diameter of 1 to 6 mm and a length of 1 to 6 mm, preferably a bottom diameter of 2 to 5 mm and a length of 2 to 5 mm.

Thus, the EVOH resin composition of the present disclosure is provided.

<Multilayer Structure>

A multilayer structure of the present disclosure includes at least one layer formed from the EVOH resin composition of the present disclosure. The layer formed from the EVOH resin composition of the present disclosure (hereinafter referred to simply as "resin composition layer") may be laminated with some other base material to be thereby imparted with higher strength and additional functions.

A thermoplastic resin other than the EVOH (hereinafter referred to as "other base resin") is preferably used as the base material.

Examples of the other base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, halogenated polyolefins such as chlorinated polyethylenes and chlorinated polypropylenes, and aromatic and aliphatic polyketones. These may be used alone or in combination.

In consideration of the hydrophobicity, the polyamide resins, the polyolefin resins, the polyester resins, and the polystyrene resins, which are hydrophobic resins, are preferred out of the aforementioned resins, and the polyolefin resins such as the polyethylene resins, the polypropylene resins, the polycycloolefin resins, and the unsaturated carboxyl-modified polyolefin resins obtained by modifying these polyolefin resins are more preferred. Particularly, the polyolefin resins are preferred.

Where resin composition layers a (a1, a2, formed from the EVOH resin composition of the present disclosure and other base resin layers b (b1, b2, . . . ) are laminated together to produce the multilayer structure of the present disclosure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like.

In the aforementioned layered configuration, as required, an adhesive resin layer may be provided between the layers. Where the other base resin layer (i.e., the layer of the thermoplastic resin other than the EVOH) is provided on at least one side of the resin composition layer with the adhesive resin layer provided therebetween in the multilayer structure, the effects of the present disclosure tend to be more efficiently provided.

Where the multilayer structure further includes a recycle layer R formed from a mixture obtained by re-melting cutoff pieces and defective products occurring during the production of the multilayer structure and containing the EVOH resin composition of the present disclosure and the other base resin, possible combinations of the layers for the layered configuration include b/R/a, b/R/a/b, b/R/a/R/b, b/a/R/a/b, b/R/a/R/a/R/b, and the like. The total number of the layers of the multilayer structure of the present disclosure is typically 2 to 15, preferably 3 to 10.

The layered configuration of the multilayer structure of the present disclosure preferably includes, as a structural unit, at least a basic unit including an intermediate layer formed from the EVOH resin composition of the present disclosure and other base resin layers provided on opposite outer sides of the intermediate layer (b/a/b, or b/adhesive resin layer/a/adhesive resin layer/b).

A known adhesive resin may be used as an adhesive resin layer forming material. The adhesive resin may be properly selected according to the type of the thermoplastic resin to be used for the other base resin layers. The adhesive resin is typically a carboxyl-containing modified polyolefin polymer prepared by chemically bonding an unsaturated carboxylic acid or its anhydride to a polyolefin resin by an addition reaction, a graft reaction or the like. Examples of the carboxyl-containing modified polyolefin polymer include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride, which may be used alone or in combination.

In this case, the amount of the unsaturated carboxylic acid or its anhydride contained in the carboxyl-containing modified polyolefin polymer is typically 0.001 to 3 wt. %, preferably 0.01 to 1 wt. %, particularly preferably 0.03 to 0.5 wt. %. If the modification degree of the modification product is low, the adhesiveness tends to be insufficient. If the modification degree is excessively high, a crosslinking reaction tends to occur, thereby deteriorating the formability.

The EVOH (A), another EVOH, a rubber/elastomer component such as polyisobutylene or ethylene-propylene rubber, and/or a resin for the polyolefin resin layer may be blended with the adhesive resin. Particularly, a polyolefin resin different from the base polyolefin resin for the adhesive resin may be blended with the base polyolefin resin.

The base resin and the adhesive resin may each contain the aliphatic carboxylic acid (B), the aliphatic carboxylic acid metal salt (C), and the alkali metal compound (D) to be used in the present disclosure as well as a conventionally known additive in an amount that does not impair the effects of the present disclosure (e.g., in an amount of not greater than 30 wt. %, preferably not greater than 10 wt. %). Examples of the additive include plasticizer (ethylene glycol, glycerin, hexanediol or the like), filler, clay (montmorillonite or the like), colorant, antioxidant, antistatic agent, lubricant (e.g., alkali metal salt or alkali earth metal salt of C10 to C30 higher fatty acid, higher fatty acid ester (methyl ester, isopropyl ester, butyl ester, octyl ester or the like of higher fatty acid), higher fatty acid amide (saturated fatty acid amide such as stearamide or behenamide, unsaturated fatty acid amide such as oleamide or erucamide, or bis-fatty acid amide such as ethylene bis-stearamide, ethylene bis-oleamide, ethylene bis-erucamide or ethylene bis-lauramide), low-molecular weight polyolefin (e.g., low-molecular weight polyethylene or low-molecular weight polypropylene having a molecular weight of about 500 to about 10,000), or fluorinated ethylene resin), nucleating agent, antiblocking agent, and wax. These may be used alone or in combination.

In the present disclosure, at least one selected from the group consisting of the aliphatic carboxylic acid (B), the aliphatic carboxylic acid metal salt (C), and the alkali metal compound (D) is preferably blended with the resin to be used for the adhesive resin layer. Particularly, where the adhesive resin layer adjacent to the resin composition layer in the multilayer structure of the present disclosure contains the aliphatic carboxylic acid (B), the aliphatic carboxylic acid metal salt (C), and the alkali metal compound (D), the multilayer structure is more excellent in impact resistance.

For production of the multilayer structure, the resin composition layer formed from the EVOH resin composition of the present disclosure and the other base resin layer may be laminated together (optionally with the adhesive resin layer provided therebetween) by a known laminating method. Examples of the laminating method include: a method in which a film or a sheet of the EVOH resin composition of the present disclosure is laminated with the other base resin by melt extrusion; a method in which the other base resin layer is laminated with the EVOH resin composition of the present disclosure by melt extrusion; a method in which the EVOH resin composition of the present disclosure and the other base resin are coextruded; a method in which a film (layer) formed from the EVOH resin composition of the present disclosure and the other base resin layer are dry-laminated together with the use of a known adhesive agent such as of organic titanium compound, isocyanate compound, polyester compound or polyurethane compound; and a method in which a solution of the EVOH resin composition of the present disclosure is applied on the other base resin layer, and a solvent is removed from the applied solution. Of these methods, the coextrusion method is preferred from the viewpoint of costs and environmental concerns.

The multilayer structure described above may be used as it is to be formed into various shapes, but may be further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is typically selected from a range of about 40° C. to about 170° C., preferably about 60° C. to about 160° C. If the stretching temperature is excessively low, the stretchability tends to be poorer. If the stretching temperature is excessively high, it will be difficult to ensure stable stretching.

The resulting multilayer structure may be further subjected to a heat-setting process to ensure dimensional stability after the stretching. The heat-setting process may be performed in a well-known manner. For example, the stretched multilayer structure (stretched film) is typically heat-treated at 80° C. to 180° C., preferably 100° C. to 165° C., for about 2 to about 600 seconds, while being kept tense.

Where the stretched multilayer film produced by using the EVOH resin composition of the present disclosure is used as a shrinkable film, the stretched film may be cold-set so as to be imparted with a heat-shrinkable property by applying cold air over the stretched film without performing the above heat-setting process.

Further, a cup-shaped or tray-shaped multilayer container may be produced from the multilayer structure of the present disclosure. For the production of the multilayer container, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the multilayer structure of the present disclosure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) of the present disclosure and the thicknesses of the resin composition layer, the other base resin layer, and the adhesive resin layer of the multilayer structure vary depending upon the layered configuration, the type of the base resin, the type of the adhesive resin, and the use purpose, the package shape, the required physical properties, and the like of the multilayer structure. Where the resin composition layer, the adhesive resin layer, and/or the other base resin layer each include two or more layers, the following thickness values are each defined as the total thickness of the layers of the same type.

The thickness of the multilayer structure (or the stretched multilayer structure) of the present disclosure is typically 10 to 5,000 μm, preferably 30 to 3,000 μm, particularly preferably 50 to 2,000 μm. If the thickness of the overall multilayer structure is excessively small, the gas barrier properties tend to be deteriorated. If the thickness of the overall multilayer structure is excessively great, the gas barrier properties are excessive, and materials for the multilayer structure are unnecessarily required. This is not economically preferred. The thickness of the resin composition layer of the multilayer structure of the present disclosure is typically 1 to 500 μm, preferably 3 to 300 μm, particularly preferably 5 to 200 μm. The thickness of the other base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the resin composition layer and the other base resin layer of the multilayer structure (resin composition layer/other base resin layer) (if these layers each include a plurality of layers, the thickness ratio between the thickest one of the resin composition layers and the thickest one of the other base resin layers) is typically 1/99 to 50/50, preferably 5/95 to 45/55, particularly preferably 10/90 to 40/60. The thickness ratio between the resin composition layer and the adhesive resin layer of the multilayer structure (resin composition layer/adhesive resin layer) (if these layers each include a plurality of layers, the thickness ratio between the thickest one of the resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film or the stretched film formed in the aforementioned manner are useful as packaging material containers for general foods, condiments such as mayonnaise and dressing, fermented foods such as miso, fat and oil such as salad oil, beverages, cosmetics, and pharmaceutical products.

EXAMPLES

The embodiments of the present disclosure will hereinafter be described more specifically by way of examples thereof. However, it should be understood that the present disclosure be not limited to the examples within the scope of the present disclosure. In the following examples, "%" is based on weight, unless otherwise specified.

Example 1

[Production of Resin Composition]

EVOH pellets containing an EVOH (a1) (ethylene-vinyl alcohol copolymer having an ethylene structural unit content of 29 mol %, a saponification degree of 99.7 mol %, and an MFR of 3.8 g/10 minutes (as measured at 210° C. with a load of 2160 g)) as the EVOH (A) and sodium acetate (d1) as the alkali metal compound (D) were prepared. Stearic acid (b1) was used as the aliphatic carboxylic acid (B), and zinc stearate (c1) was used as the aliphatic carboxylic acid metal salt (C). The amount of sodium acetate (d1) contained in the EVOH pellets was 0.017% on a metal basis based on the total amount of the EVOH (a1), stearic acid (b1), zinc stearate (c1), and sodium acetate (d1).

The amount of zinc stearate (c1) was 0.0015% on a metal basis based on the total amount of the EVOH (a1), stearic acid (b1), zinc stearate (c1), and sodium acetate (d1), and the amount of stearic acid (b1) was 0.5% based on the total amount of steric acid (b1) and zinc stearate (c1). An EVOH resin composition of Example 1 was produced by collectively dry-blending the EVOH pellets containing the EVOH (a1) and sodium acetate (d1), stearic acid (b1), and zinc stearate (c1).

[Production of Multilayer Structure]

The EVOH resin composition produced in the aforementioned manner, a linear low-density polyethylene (LLDPE) (UF240 available from Japan Polyethylene Corporation, and having an MFR of 2.1 g/10 minutes (as measured at 190° C. with a load of 2160 g)), and an adhesive resin (PLEXAR PX3236 available from LyondellBasell LLC., and having an MFR of 2.0 g/10 minutes (as measured at 190° C. with a load of 2160 g)) were fed into a 3-type 5-layer multilayer coextrusion cast film forming apparatus, whereby a 3-type 5-layer multilayer structure (film) of LLDPE layer/adhesive resin layer/EVOH resin composition layer/adhesive resin layer/LLDPE layer was produced under the following conditions by a multilayer coextrusion method. The thicknesses (μm) of the respective layers of the multilayer structure were 37.5/5/15/5/37.5. The die temperatures of the forming apparatus were all set at 210° C.

(Conditions for Multilayer Coextrusion)

Intermediate layer extruder (for EVOH resin composition): a 40-mm diameter single screw extruder (having a barrel temperature of 210° C.)

Upper and lower layer extruders (for LLDPE): 40-mm diameter single screw extruders (each having a barrel temperature of 210° C.)

Middle upper and lower layer extruders (for adhesive resin): 32-mm diameter single screw extruders (each having a barrel temperature of 210° C.)

Die: a 3-type 5-layer feed block T-die (having a die temperature of 210° C.)

Take-up speed: 9.0 m/minute

Roll temperature: 50° C.

The following color tone stability evaluation test was performed on the EVOH resin composition produced in the aforementioned manner, and the following gas barrier property, impact strength, and adhesive strength evaluation tests were performed on the multilayer structure produced in the aforementioned manner.

<Color Tone Stability Evaluation of EVOH Resin Composition>

A sample was prepared by putting 5 g of the EVOH resin composition produced in the aforementioned manner in a 30-mm diameter aluminum cup (DISPODISH PP-724 available from As One Corporation) and keeping the aluminum cup in an air atmosphere at 210° C. for two hours, and was used for the color tone evaluation. The color tone evaluation test was performed by the following evaluation method by means of the following apparatus.

Instrument used: Visual analyzer IRIS VA400 (available from Alpha M.O.S. Japan K.K.)

Data analysis software: Alpha Software V14.3

Objective lens: 25 mm (available from Basler AG)

Lighting mode: Upper and lower lighting

Evaluation method: The color tone evaluation sample was set on a tray in a chamber of the visual analyzer, and a plane image of the entire color tone evaluation sample was photographed by a CCD camera. Then, the image was processed with the use of the data analysis software, whereby a color pattern of the sample was obtained. The resin composition was evaluated for color tone stability based on the lightness (L*) of the highest percentage color (major color) of the color pattern. In the color tone stability evaluation, a higher lightness value means more excellent color tone stability, and a lower lightness value means poorer color tone stability. The result is shown in Table 1.

<Gas Barrier Property of Multilayer Structure>

The multilayer structure produced in the aforementioned manner was evaluated for gas barrier property at 20° C. at 65% RH by means of an oxygen gas permeability measuring apparatus (OX-TRAN 2/21 available from MOCON Inc.)

The result is shown in Table 1.

<Impact Strength of Multilayer Structure>

The impact strength (kgf·cm) of the multilayer structure produced in the aforementioned manner was measured in a 23° C. and 50% RH atmosphere by means of a YSS type film impact tester (MODEL 181 available from Yasuda Seiki Seisakusho, Ltd.) The measurement was performed ten times, and the impact strength values thus measured were averaged. The multilayer structure was evaluated for the impact strength based on the impact strength average. The film impact tester had a clamp inner diameter of 60 mm, an impact ball radius of 12.7 mm, and a pendulum lift angle of 90 degrees. A higher impact strength value means that the multilayer structure was more excellent in impact strength, and a lower impact strength value means that the multilayer structure was poorer in impact strength. The result is shown in Table 1.

<Adhesive Strength of Multilayer Structure>

The adhesive strength (N/15 mm) between the EVOH resin composition layer and the adhesive resin layer of the multilayer structure produced in the aforementioned manner was measured by the following T-peel test. The measurement was performed 10 times, and adhesive strength values thus measured were averaged. The multilayer structure was evaluated for the adhesive strength based on the adhesive strength average. A higher adhesive strength value means that the multilayer structure was more excellent in adhesive strength, and a lower adhesive strength value means that the multilayer structure was poorer in adhesive strength. The result is shown in Table 1.

(Conditions for T-Peel Test)
Apparatus: Autograph AGS-H (available from Shimadzu Corporation)
Load Cell: 500N
Test method: T-peel method (A test strip was held in a T-shape for peeling thereof)
Size of test strip: 15-mm width
Test speed: 300 mm/minute Example 2

An EVOH resin composition and a multilayer structure were produced in substantially the same manner as in Example 1, except that the amount of zinc stearate (c1) was 0.003% on a metal basis based on the total amount of the EVOH (a1), stearic acid (b1), zinc stearate (c1), and sodium acetate (d1). The EVOH resin composition and the multilayer structure thus produced were evaluated in the same manner as in Example 1.

Example 3

An EVOH resin composition and a multilayer structure were produced in substantially the same manner as in Example 1, except that the amount of zinc stearate (c1) was 0.0045% on a metal basis based on the total amount of the EVOH (a1), stearic acid (b1), zinc stearate (c1), and sodium acetate (d1). The EVOH resin composition and the multilayer structure thus produced were evaluated in the same manner as in Example 1.

Example 4

An EVOH resin composition and a multilayer structure were produced in substantially the same manner as in Example 1, except that the amount of zinc stearate (c1) was 0.006% on a metal basis based on the total amount of the EVOH (a1), stearic acid (b1), zinc stearate (c1), and sodium acetate (d1). The EVOH resin composition and the multilayer structure thus produced were evaluated in the same manner as in Example 1.

Example 5

An EVOH resin composition and a multilayer structure were produced in substantially the same manner as in Example 1, except that caproic acid (b2) was used instead of stearic acid (b1), that zinc caproate (c2) was used instead of zinc stearate (c1), that the amount of zinc caproate (c2) was 0.0045% on a metal basis based on the total amount of the EVOH (a1), caproic acid (b2), zinc caproate (c2), and sodium acetate (d1), and that the amount of caproic acid (b2) was 4% based on the total amount of caproic acid (b2) and zinc caproate (c2). The EVOH resin composition and the multilayer structure thus produced were evaluated in the same manner as in Example 1.

Example 6

An EVOH resin composition and a multilayer structure were produced in substantially the same manner as in Example 1, except that caprylic acid (b3) was used instead of stearic acid (b1), that zinc caprylate (c3) was used instead of zinc stearate (c1), that the amount of zinc caprylate (c3) was 0.0015% on a metal basis based on the total amount of the EVOH (a1), caprylic acid (b3), zinc caprylate (c3), and sodium acetate (d1), and that the amount of caprylic acid (b3) was 2.5% based on the total amount of caprylic acid (b3) and zinc caprylate (c3). The EVOH resin composition and the multilayer structure thus produced were evaluated in the same manner as in Example 1.

Example 7

An EVOH resin composition and a multilayer structure were produced in substantially the same manner as in Example 6, except that the amount of zinc caprylate (c3) was 0.003% on a metal basis based on the total amount of the EVOH (a1), caprylic acid (b3), zinc caprylate (c3), and sodium acetate (d1). The EVOH resin composition and the multilayer structure thus produced were evaluated in the same manner as in Example 1.

Example 8

An EVOH resin composition and a multilayer structure were produced in substantially the same manner as in Example 6, except that the amount of zinc caprylate (c3) was 0.0045% on a metal basis based on the total amount of the EVOH (a1), caprylic acid (b3), zinc caprylate (c3), and sodium acetate (d1). The EVOH resin composition and the multilayer structure thus produced were evaluated in the same manner as in Example 1.

Example 9

An EVOH resin composition and a multilayer structure were produced in substantially the same manner as in Example 6, except that the amount of zinc caprylate (c3) was 0.006% on a metal basis based on the total amount of the EVOH (a1), caprylic acid (b3), zinc caprylate (c3), and sodium acetate (d1). The EVOH resin composition and the multilayer structure thus produced were evaluated in the same manner as in Example 1.

Example 10

An EVOH resin composition and a multilayer structure were produced in substantially the same manner as in Example 1, except that lauric acid (b4) was used instead of stearic acid (b1), that zinc laurate (c4) was used instead of zinc stearate (c1), and that the amount of zinc laurate (c4) was 0.0015% on a metal basis based on the total amount of the EVOH (a1), lauric acid (b4), zinc laurate (c4), and sodium acetate (d1). The EVOH resin composition and the multilayer structure thus produced were evaluated in the same manner as in Example 1.

Example 11

An EVOH resin composition and a multilayer structure were produced in substantially the same manner as in Example 10, except that the amount of zinc laurate (c4) was 0.003% on a metal basis based on the total amount of the EVOH (a1), lauric acid (b4), zinc laurate (c4), and sodium acetate (d1). The EVOH resin composition and the multilayer structure thus produced were evaluated in the same manner as in Example 1.

Example 12

An EVOH resin composition and a multilayer structure were produced in substantially the same manner as in Example 10, except that the amount of zinc laurate (c4) was 0.0045% on a metal basis based on the total amount of the EVOH (a1), lauric acid (b4), zinc laurate (c4), and sodium acetate (d1). The EVOH resin composition and the multilayer structure thus produced were evaluated in the same manner as in Example 1.

Example 13

An EVOH resin composition and a multilayer structure were produced in substantially the same manner as in Example 10, except that the amount of zinc laurate (c4) was 0.006% on a metal basis based on the total amount of the EVOH (a1), lauric acid (b4), zinc laurate (c4), and sodium acetate (d1). The EVOH resin composition and the multilayer structure thus produced were evaluated in the same manner as in Example 1.

Example 14

An EVOH resin composition and a multilayer structure were produced in substantially the same manner as in Example 1, except that behenic acid (b5) was used instead of stearic acid (b1), that zinc behenate (c5) was used instead of zinc stearate (c1), and that the amount of zinc behenate (c5) was 0.0045% on a metal basis based on the total amount of the EVOH (a1), behenic acid (b5), zinc behenate (c5), and sodium acetate (d1). The EVOH resin composition and the multilayer structure thus produced were evaluated in the same manner as in Example 1.

Example 15

An EVOH resin composition and a multilayer structure were produced in substantially the same manner as in Example 6, except that EVOH pellets containing an EVOH (a2) (ethylene-vinyl alcohol copolymer having an ethylene structural unit content of 32 mol %, a saponification degree of 99.7 mol %, and an MFR of 3.8 g/10 minutes (as measured at 210° C. with a load of 2160 g)) instead of the EVOH (a1), and sodium acetate (d1) as the alkali metal compound (D) were used, that the amount of sodium acetate (d1) contained in the EVOH pellets was 0.018% on a metal basis based on the total amount of the EVOH (a2), caprylic acid (b3), zinc caprylate (c3), and sodium acetate (d1), and that the amount of zinc caprylate (c3) was 0.0045% on a metal basis based on the total amount of the EVOH (a2), caprylic acid (b3), zinc caprylate (c3), and sodium acetate (d1). The EVOH resin composition and the multilayer structure thus produced were evaluated in the same manner as in Example 1.

Example 16

An EVOH resin composition and a multilayer structure were produced in substantially the same manner as in Example 15, except that EVOH pellets containing an EVOH (a3) (ethylene-vinyl alcohol copolymer having an ethylene structural unit content of 38 mol %, a saponification degree of 99.7 mol %, and an MFR of 4.0 g/10 minutes (as measured at 210° C. with a load of 2160 g)) instead of the EVOH (a2), and sodium acetate (d1) as the alkali metal compound (D) were used, and that the amount of sodium acetate (d1) contained in the EVOH pellets was 0.025% on a metal basis based on the total amount of the EVOH (a3), caprylic acid (b3), zinc caprylate (c3), and sodium acetate (d1). The EVOH resin composition and the multilayer structure thus produced were evaluated in the same manner as in Example 1.

Example 17

An EVOH resin composition and a multilayer structure were produced in substantially the same manner as in Example 15, except that EVOH pellets containing an EVOH (a4) (ethylene-vinyl alcohol copolymer having an ethylene structural unit content of 44 mol %, a saponification degree of 99.7 mol %, and an MFR of 3.5 g/10 minutes (as measured at 210° C. with a load of 2160 g)) instead of the EVOH (a2), and sodium acetate (d1) as the alkali metal compound (D) were used, and that the amount of sodium acetate (d1) contained in the EVOH pellets was 0.015% on a metal basis based on the total amount of the EVOH (a4), caprylic acid (b3), zinc caprylate (c3), and sodium acetate (d1). The EVOH resin composition and the multilayer structure thus produced were evaluated in the same manner as in Example 1.

Comparative Example 1

An EVOH resin composition and a multilayer structure were produced in substantially the same manner as in Example 1, except that stearic acid (b1) and zinc stearate (c1) were not used. The EVOH resin composition and the multilayer structure thus produced were evaluated in the same manner as in Example 1.

Comparative Example 2

An EVOH resin composition and a multilayer structure were produced in substantially the same manner as in Example 8, except that EVOH pellets containing an EVOH (a5) (ethylene-vinyl alcohol copolymer having an ethylene structural unit content of 29 mol %, a saponification degree of 99.6 mol %, and an MFR of 8.8 g/10 minutes (as measured at 210° C. with a load of 2160 g)) instead of the EVOH (a1), and not containing sodium acetate (d1) were used. The EVOH resin composition and the multilayer structure thus produced were evaluated in the same manner as in Example 1.

Comparative Example 3

An EVOH resin composition and a multilayer structure were produced in substantially the same manner as in Example 8, except that EVOH pellets containing an EVOH (a6) (ethylene-vinyl alcohol copolymer having an ethylene structural unit content of 29 mol %, a saponification degree of 99.6 mol %, and an MFR of 8.8 g/10 minutes (as measured at 210° C. with a load of 2160 g)) instead of the EVOH (a1), and sodium acetate (d1) as the alkali metal compound (D) were used, and that the amount of sodium acetate (d1) contained in the EVOH pellets was 0.5% on a metal basis based on the total amount of the EVOH (a6), caprylic acid (b3), zinc caprylate (c3), and sodium acetate (d1). The EVOH resin composition and the multilayer structure thus produced were evaluated in the same manner as in Example 1.

Comparative Example 4

An EVOH resin composition and a multilayer structure were produced in substantially the same manner as in Example 3, except that EVOH pellets containing an EVOH (a7) (ethylene-vinyl alcohol copolymer having an ethylene structural unit content of 29 mol %, a saponification degree of 99.6 mol %, and an MFR of 8.8 g/10 minutes (as measured at 210° C. with a load of 2160 g)) instead of the EVOH (a1), and sodium acetate (d1) as the alkali metal compound (D) were used, and that the amount of sodium acetate (d1) contained in the EVOH pellets was 0.75% on a metal basis based on the total amount of the EVOH (a7), stearic acid (b1), zinc stearate (c1), and sodium acetate (d1). The EVOH resin composition and the multilayer structure thus produced were evaluated in the same manner as in Example 1.

Comparative Example 5

An EVOH resin composition and a multilayer structure were produced in substantially the same manner as in Example 1, except that zinc stearate (c1) was not used, and that the amount of stearic acid (b1) was 0.0436% based on the total amount of the EVOH (a1) and stearic acid (b1). The EVOH resin composition and the multilayer structure thus produced were evaluated in the same manner as in Example 1.

Comparative Example 6

An EVOH resin composition and a multilayer structure were produced in substantially the same manner as in Example 3, except that the amount of stearic acid (b1) was 50% based on the total amount of stearic acid (b1) and zinc stearate (c1). The EVOH resin composition and the multilayer structure thus produced were evaluated in the same manner as in Example 1.

Comparative Example 7

An EVOH resin composition and a multilayer structure were produced in substantially the same manner as in Example 8, except that the amount of caprylic acid (b3) was 50% based on the total amount of caprylic acid (b3) and zinc caprylate (c3). The EVOH resin composition and the multilayer structure thus produced were evaluated in the same manner as in Example 1.

Comparative Example 8

An EVOH resin composition and a multilayer structure were produced in substantially the same manner as in Example 12, except that the amount of lauric acid (b4) was 50% based on the total amount of lauric acid (b4) and zinc laurate (c4). The EVOH resin composition and the multilayer structure thus produced were evaluated in the same manner as in Example 1.

Comparative Example 9

An EVOH resin composition and a multilayer structure were produced in substantially the same manner as in Example 1, except that calcium stearate was used instead of zinc stearate (c1), that the amount of calcium stearate was 0.0045% on a metal basis based on the total amount of the EVOH (a1), stearic acid (b1), sodium acetate (d1), and calcium stearate, and that the amount of stearic acid (b1) was 0.25% based on the total amount of stearic acid (b1) and calcium stearate. The EVOH resin composition and the multilayer structure thus produced were evaluated in the same manner as in Example 1.

Comparative Example 10

An EVOH resin composition and a multilayer structure were produced in substantially the same manner as in Example 1, except that magnesium stearate was used instead of zinc stearate (c1), that the amount of magnesium stearate was 0.0045% on a metal basis based on the total amount of the EVOH (a1), stearic acid (b1), sodium acetate (d1), and magnesium stearate, and that the amount of stearic acid (b1) was 1.25% based on the total amount of stearic acid (b1) and magnesium stearate. The EVOH resin composition and the multilayer structure thus produced were evaluated in the same manner as in Example 1.

Comparative Example 11

An EVOH resin composition and a multilayer structure were produced in substantially the same manner as in Example 1, except that sodium stearate was used instead of zinc stearate (c1), that the amount of sodium stearate was 0.0045% on a metal basis based on the total amount of the EVOH (a1), stearic acid (b1), sodium acetate (d1), and sodium stearate, and that the amount of stearic acid (b1) was 0.5% based on the total amount of stearic acid (b1) and sodium stearate. The EVOH resin composition and the multilayer structure thus produced were evaluated in the same manner as in Example 1.

Comparative Example 12

An EVOH resin composition and a multilayer structure were produced in substantially the same manner as in Example 1, except that zinc gluconate trihydrate was used instead of zinc stearate (c1), that the amount of zinc gluconate trihydrate was 0.0045% on a metal basis based on the total amount of the EVOH (a1), stearic acid (b1), sodium acetate (d1), and zinc gluconate trihydrate, and that the amount of stearic acid (b1) was 0.5% based on the total amount of stearic acid (b1) and zinc gluconate trihydrate. The EVOH resin composition and the multilayer structure thus produced were evaluated in the same manner as in Example 1.

Comparative Example 13

An EVOH resin composition and a multilayer structure were produced in substantially the same manner as in Example 1, except that zinc citrate dihydrate was used instead of zinc stearate (c1), that the amount of zinc citrate dihydrate was 0.0045% on a metal basis based on the total amount of the EVOH (a1), stearic acid (b1), sodium acetate (d1), and zinc citrate dihydrate, and that the amount of stearic acid (b1) was 0.5% based on the total amount of stearic acid (b1) and zinc citrate dihydrate. The EVOH resin composition and the multilayer structure thus produced were evaluated in the same manner as in Example 1.

Comparative Example 14

An EVOH resin composition and a multilayer structure were produced in substantially the same manner as in Example 1, except that calcium gluconate monohydrate was used instead of zinc stearate (c1), that the amount of calcium gluconate monohydrate was 0.0045% on a metal basis based on the total amount of the EVOH (a1), stearic acid (b1), sodium acetate (d1), and calcium gluconate monohydrate, and that the amount of stearic acid (b1) was 0.5% based on the total amount of stearic acid (b1) and calcium gluconate monohydrate. The EVOH resin composition and the multilayer structure thus produced were evaluated in the same manner as in Example 1.

Comparative Example 15

An EVOH resin composition and a multilayer structure were produced in substantially the same manner as in Example 1, except that calcium citrate tetrahydrate was used instead of zinc stearate (c1), that the amount of calcium citrate tetrahydrate was 0.0045% on a metal basis based on the total amount of the EVOH (a1), stearic acid (b1), sodium acetate (d1), and calcium citrate tetrahydrate, and that the amount of stearic acid (b1) was 0.5% based on the total amount of stearic acid (b1) and calcium citrate tetrahydrate. The EVOH resin composition and the multilayer structure thus produced were evaluated in the same manner as in Example 1.

The components of the EVOH resin compositions produced in the aforementioned manner, the amounts of the components contained in the EVOH resin compositions, (D)/(C), and (D)/[(B)/((B)+(C))] (wherein (C) and (D) are amounts on metal basis), and evaluation results obtained in the aforementioned manner are shown below in Tables 1 and 2.

TABLE 1

| | Example 1 | Example 2 | Example 3 | Example 4 | Example 5 | Example 6 |
|---|---|---|---|---|---|---|
| Ethylene content [mol %] of EVOH (A) | 29 | 29 | 29 | 29 | 29 | 29 |
| Aliphatic carboxylic acid (B) | Stearic acid | Stearic acid | Stearic acid | Stearic acid | Caproic acid | Caprylic acid |
| Amount [%] of (B) *1 | 0.5 | 0.5 | 0.5 | 0.5 | 4 | 2.5 |
| Aliphatic carboxylic acid metal salt (C) | Zinc stearate | Zinc stearate | Zinc stearate | Zinc stearate | Zinc caproate | Zinc caprylate |
| Amount [%] of (C) (on metal basis) *2 | 0.0015 | 0.003 | 0.0045 | 0.006 | 0.0045 | 0.0015 |
| Amount [%] of (D) (on metal basis) *3 | 0.017 | 0.017 | 0.017 | 0.017 | 0.017 | 0.017 |
| (D)/(C) (on metal basis) | 11.3 | 5.7 | 3.8 | 2.8 | 3.8 | 11.3 |
| (D)/[(B)/((B) + (C))] (wherein (C) and (D) are on metal basis) | 0.034 | 0.034 | 0.034 | 0.034 | 0.00425 | 0.0068 |
| Gas barrier property [cc · 20 μm/m² · day · atm] | 0.2 | 0.2 | 0.2 | 0.2 | 0.2 | 0.2 |
| Color tone stability (air atmosphere at 210° C. for 2 hours) | 58.2 | 56.0 | 53.9 | 51.7 | 58.3 | 59.6 |
| Impact strength [kgf · cm] | 17.0 | 17.3 | 17.4 | 17.4 | 18.2 | 17.6 |
| Adhesive strength [N/15 mm] | 7.2 | 7.2 | 7.2 | 7.2 | 7.2 | 7.2 |

| | Example 7 | Example 8 | Example 9 | Example 10 | Example 11 | Example 12 |
|---|---|---|---|---|---|---|
| Ethylene content [mol %] of EVOH (A) | 29 | 29 | 29 | 29 | 29 | 29 |
| Aliphatic carboxylic acid (B) | Caprylic acid | Caprylic acid | Caprylic acid | Lauric acid | Lauric acid | Lauric acid |
| Amount [%] of (B) *1 | 2.5 | 2.5 | 2.5 | 0.5 | 0.5 | 0.5 |
| Aliphatic carboxylic acid metal salt (C) | Zinc caprylate | Zinc caprylate | Zinc caprylate | Zinc laurate | Zinc laurate | Zinc laurate |
| Amount [%] of (C) (on metal basis) *2 | 0.003 | 0.0045 | 0.006 | 0.0015 | 0.003 | 0.0045 |
| Amount [%] of (D) (on metal basis) *3 | 0.017 | 0.017 | 0.017 | 0.017 | 0.017 | 0.017 |
| (D)/(C) (on metal basis) | 5.7 | 3.8 | 2.8 | 11.3 | 5.7 | 3.8 |
| (D)/[(B)/((B) + (C))] (wherein (C) and (D) are on metal basis) | 0.0068 | 0.0068 | 0.0068 | 0.034 | 0.034 | 0.034 |
| Gas barrier property [cc · 20 μm/m² · day · atm] | 0.2 | 0.2 | 0.2 | 0.2 | 0.2 | 0.2 |
| Color tone stability (air atmosphere at 210° C. for 2 hours) | 58.8 | 58.1 | 57.3 | 57.9 | 55.3 | 52.8 |
| Impact strength [kgf · cm] | 17.9 | 18.0 | 18.0 | 17.3 | 17.6 | 17.7 |
| Adhesive strength [N/15 mm] | 7.2 | 7.2 | 7.2 | 7.2 | 7.2 | 7.2 |

| | Example 13 | Example 14 | Example 15 | Example 16 | Example 17 |
|---|---|---|---|---|---|
| Ethylene content [mol %] of EVOH (A) | 29 | 29 | 32 | 38 | 44 |
| Aliphatic carboxylic acid (B) | Lauric acid | Behenic acid | Caprylic acid | Caprylic acid | Caprylic acid |

TABLE 1-continued

|  |  |  |  |  |  |
|---|---|---|---|---|---|
| Amount [%] of (B) *1 | 0.5 | 0.5 | 2.5 | 2.5 | 2.5 |
| Aliphatic carboxylic acid metal salt (C) | Zinc laurate | Zinc behenate | Zinc caprylate | Zinc caprylate | Zinc caprylate |
| Amount [%] of (C) (on metal basis) *2 | 0.006 | 0.0045 | 0.0045 | 0.0045 | 0.0045 |
| Amount [%] of (D) (on metal basis) *3 | 0.017 | 0.017 | 0.018 | 0.025 | 0.015 |
| (D)/(C) (on metal basis) | 2.8 | 3.8 | 4.0 | 5.6 | 3.3 |
| (D)/[(B)/((B) + (C))] (wherein (C) and (D) are on metal basis) | 0.034 | 0.034 | 0.0072 | 0.01 | 0.006 |
| Gas barrier property [cc · 20 μm/m² · day · atm] | 0.2 | 0.2 | 0.3 | 0.7 | 1.5 |
| Color tone stability (air atmosphere at 210° C. for 2 hours) | 50.2 | 55.0 | 61.2 | 68.7 | 62.3 |
| Impact strength [kgf · cm] | 17.7 | 17.1 | 17.8 | 17.7 | 17.5 |
| Adhesive strength [N/15 mm] | 7.2 | 7.2 | 7.2 | 7.2 | 7.2 |

*1 Amount [%] of (B) = (B)/[(B) + (C)] × 100
*2 Amount [%] of (C) = (C)/[(A) + (B) + (C) + (D)] × 100
*3 Amount [%] of (D) = (D)/[(A) + (B) + (C) + (D)] × 100

TABLE 2

|  | Comparative Example 1 | Comparative Example 2 | Comparative Example 3 | Comparative Example 4 | Comparative Example 5 |
|---|---|---|---|---|---|
| Ethylene content [mol %] of EVOH (A) | 29 | 29 | 29 | 29 | 29 |
| Aliphatic carboxylic acid (B) | — | Caprylic acid | Caprylic acid | Stearic acid | Stearic acid (0.0436%) |
| Amount [%] of (B) *1 | — | 2.5 | 2.5 | 0.5 | 100 |
| Aliphatic carboxylic acid metal salt (C) | — | Zinc caprylate | Zinc caprylate | Zinc stearate | — |
| Amount [%] of (C) (on metal basis) *2 | — | 0.0045 | 0.0045 | 0.0045 | — |
| Amount [%] of (D) (on metal basis) *3 | 0.017 | — | 0.5 | 0.75 | 0.017 |
| (D)/(C) (on metal basis) | — | — | 111 | 250 | — |
| (D)/[ (B)/( (B) + (C) ) ] (wherein (C) and (D) are on metal basis) | — | — | 0.2 | 1.5 | 0.00017 |
| Gas barrier property [cc · 20 μm/m² · day · atm] | 0.2 | 0.2 | 0.2 | 0.2 | 0.2 |
| Color tone stability (air atmosphere at 210° C. for 2 hours) | 60.4 | 58.3 | 24.3 | 22.3 | 40.3 |
| Impact strength [kgf · cm] | 14.3 | 17.3 | 10.6 | 9.7 | 14.0 |
| Adhesive strength [N/15 mm] | 7.2 | 2.7 | 3.5 | 3.1 | 7.2 |

|  | Comparative Example 6 | Comparative Example 7 | Comparative Example 8 | Comparative Example 9 | Comparative Example 10 |
|---|---|---|---|---|---|
| Ethylene content [mol %] of EVOH (A) | 29 | 29 | 29 | 29 | 29 |
| Aliphatic carboxylic acid (B) | Stearic acid | Caprylic acid | Lauric acid | Stearic acid | Stearic acid |
| Amount [%] of (B) *1 | 50 | 50 | 50 | 0.25 | 1.25 |
| Aliphatic carboxylic acid metal salt (C) | Zinc stearate | Zinc caprylate | Zinc laurate | Calcium stearate | Magnesium stearate |
| Amount [%] of (C) (on metal basis) *2 | 0.0045 | 0.0045 | 0.0045 | 0.0045 | 0.0045 |
| Amount [%] of (D) (on metal basis) *3 | 0.017 | 0.017 | 0.017 | 0.017 | 0.017 |
| (D)/(C) (on metal basis) | 3.8 | 3.8 | 3.8 | 3.8 | 3.8 |
| (D)/[ (B)/( (B) + (C) ) ] (wherein (C) and (D) are on metal basis) | 0.00034 | 0.00034 | 0.00034 | 0.068 | 0.0136 |
| Gas barrier property [cc · 20 μm/m² · day · atm] | 0.2 | 0.2 | 0.2 | 0.2 | 0.2 |
| Color tone stability (air atmosphere at 210° C. for 2 hours) | 49.2 | 53.1 | 51.5 | 52.8 | 48.3 |
| Impact strength [kgf · cm] | 14.7 | 15.4 | 15.1 | 14.3 | 14.0 |
| Adhesive strength [N/15 mm] | 7.2 | 7.2 | 7.2 | 7.2 | 7.2 |

|  | Comparative Example 11 | Comparative Example 12 | Comparative Example 13 | Comparative Example 14 | Comparative Example 15 |
|---|---|---|---|---|---|
| Ethylene content [mol %] of EVOH (A) | 29 | 29 | 29 | 29 | 29 |
| Aliphatic carboxylic acid (B) | Stearic acid | Stearic acid | Stearic acid | Stearic acid | Stearic acid |
| Amount [%] of (B) *1 | 0.5 | 0.5 | 0.5 | 0.5 | 0.5 |
| Aliphatic carboxylic acid metal salt (C) | Sodium stearate | Zinc gluoonate trihydrate | Zinc citrate dihydrate | Calcium gluconate monohydrate | Calcium citrate tetrahydrate |
| Amount [%] of (C) (on metal basis) *2 | 0.0045 | 0.0045 | 0.0045 | 0.0045 | 0.0045 |
| Amount [%] of (D) (on metal basis) *3 | 0.017 | 0.017 | 0.017 | 0.017 | 0.017 |
| (D)/(C) (on metal basis) | 3.8 | 3.8 | 3.8 | 3.8 | 3.8 |

TABLE 2-continued

| | | | | | |
|---|---|---|---|---|---|
| (D)/[ (B)/( (B) + (C) ) ] (wherein (C) and (D) are on metal basis) | 0.034 | 0.034 | 0.034 | 0.034 | 0.034 |
| Gas barrier property [cc · 20 μm/m² · day · atm] | 0.2 | 0.2 | 0.2 | 0.2 | 0.2 |
| Color tone stability (air atmosphere at 210° C. for 2 hours) | 58.3 | 15.6 | 43.2 | 21.4 | 45.2 |
| Impact strength [kgf · cm] | 14.5 | 12.6 | 11.3 | 12.5 | 11.0 |
| Adhesive strength [N/15 mm] | 7.4 | 5.3 | 5.5 | 5.0 | 4.9 |

[1] Amount [%] of (B) = (B)/[ (B) + (C) ] × 100
[2] Amount [%] of (C) = (C)/[ (A) + (B) + (C) + (D) ] × 100
[3] Amount [%] of (D) = (D)/[ (A) + (B) + (C) + (D) ] × 100

In Comparative Examples 1 and 5 in which the aliphatic carboxylic acid metal salt (C) was not contained in the EVOH resin compositions, the impact strength values were 14.3 kgf·cm and 14.0 kgf·cm, respectively. In comparative Example 2 in which zinc caprylate containing a metal moiety selected from the group consisting of the long Periodic Table 4th-period d-block elements was contained as the aliphatic carboxylic acid metal salt (C) but the alkali metal compound (D) was not contained in the EVOH resin composition, on the other hand, the impact strength was higher at 17.3 kgf·cm, but the adhesive strength was lower at 2.7 N/15 mm.

In Comparative Examples 3 and 4 in which the expression (1) specified in the present disclosure was not satisfied, the impact strength and the adhesive strength were lower, and the color tone stability was poorer as well. In Comparative Examples 6, 7, and 8 in which the (D)/[(B)/((B)+(C))] values fell below the range of the expression (2) specified in the present disclosure, the impact strength was lower.

In Comparative Examples 9 to 11 in which the metal moiety of the aliphatic carboxylic acid metal salt (C) was not an element selected from the long Periodic Table 4th-period d-block elements, the impact strength was lower.

In Comparative Examples 12 to 15 in which the anion moiety of the aliphatic carboxylic acid metal salt (C) was not the same as the aliphatic carboxylic acid (B), the color tone stability was poorer.

In contrast, the EVOH resin compositions of Examples 1 to 17 according to the present disclosure were excellent in impact strength and adhesive strength without reduction in adhesive strength values, and were free from deterioration in color tone stability.

Further, packages were produced by using the multilayer structures of the Examples produced in the aforementioned manner. The packages thus produced were excellent in impact resistance and adhesive strength.

While specific forms of the embodiments of the present disclosure have been shown in the aforementioned examples, the examples are merely illustrative but not limitative. It is contemplated that various modifications apparent to those skilled in the art could be made within the scope of the disclosure.

The EVOH resin composition of the present disclosure is excellent in impact resistance and adhesive strength. Therefore, the multilayer structure including the layer formed from the EVOH resin composition of the present disclosure is useful as a material for various packaging material containers for general foods, condiments such as mayonnaise and dressing, fermented foods such as miso, fat and oil such as salad oil, beverages, cosmetics, and pharmaceutical products.

The invention claimed is:

1. An ethylene-vinyl alcohol copolymer resin composition comprising:
    (A) an ethylene-vinyl alcohol copolymer;
    (B) an aliphatic carboxylic acid;
    (C) an aliphatic carboxylic acid metal salt, which is a metal salt of the aliphatic carboxylic acid (B); and
    (D) an alkali metal compound;
    wherein the aliphatic carboxylic acid (B) has a carbon number of 3 to 30;
    wherein the aliphatic carboxylic acid metal salt (C) contains a metal moiety that comprises at least one element selected from the group consisting of long Periodic Table 4th-period d-block elements; and
    wherein amounts of the aliphatic carboxylic acid (B), the aliphatic carboxylic acid metal salt (C), and the alkali metal compound (D) on a weight basis satisfy the following expressions (1) and (2):
    $0.01 \leq$ (Amount of (D) on metal basis/Amount of (C) on metal basis) $\leq 30$ ... (1)
    $0.0005 \leq \{$ Amount of (D) on metal basis/[Amount of (B)/(Amount of (B)+Amount of (C) on metal basis)]$\} \leq 1$ ... (2).

2. The ethylene-vinyl alcohol copolymer resin composition according to claim 1, wherein the amount of the aliphatic carboxylic acid (B) is 0.01 to 40 wt. % based on a total amount of the aliphatic carboxylic acid (B) and the aliphatic carboxylic acid metal salt (C).

3. The ethylene-vinyl alcohol copolymer resin composition according to claim 1, wherein the amount of the aliphatic carboxylic acid metal salt (C) is 0.0001 to 0.05 wt. % on a metal basis based on a total amount of the ethylene-vinyl alcohol copolymer (A), the aliphatic carboxylic acid (B), the aliphatic carboxylic acid metal salt (C), and the alkali metal compound (D).

4. The ethylene-vinyl alcohol copolymer resin composition according to claim 1, wherein the amount of the alkali metal compound (D) is 0.001 to 0.1 wt. % on a metal basis based on the total amount of the ethylene-vinyl alcohol copolymer (A), the aliphatic carboxylic acid (B), the aliphatic carboxylic acid metal salt (C), and the alkali metal compound (D).

5. A multilayer structure comprising a layer that comprises the ethylene-vinyl alcohol copolymer resin composition according to claim 1.

6. A package comprising the multilayer structure according to claim 5.

* * * * *

UNITED STATES PATENT AND TRADEMARK OFFICE
CERTIFICATE OF CORRECTION

| | |
|---|---|
| PATENT NO. | : 11,248,112 B2 |
| APPLICATION NO. | : 16/779954 |
| DATED | : February 15, 2022 |
| INVENTOR(S) | : Komuro |

It is certified that error appears in the above-identified patent and that said Letters Patent is hereby corrected as shown below:

In the Claims

Column 30, Line 38 (Claim 1) please change "on metal basis)]} 1 ...(2)." to
-- on metal basis)]} $\leq$ 1 ...(2). --.

Signed and Sealed this
Seventeenth Day of May, 2022

Katherine Kelly Vidal
*Director of the United States Patent and Trademark Office*